United States Patent [19]
Bopardikar

[11] Patent Number: 6,118,931
[45] Date of Patent: *Sep. 12, 2000

[54] VIDEO DATA STORAGE

[75] Inventor: Raju C. Bopardikar, Cambridge, Mass.

[73] Assignee: Discreet Logic Inc., Montreal, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,960

[22] Filed: Apr. 11, 1997

Related U.S. Application Data

[60] Provisional application No. 60/615,412, Apr. 15, 1996.

[51] Int. Cl.[7] .................................................. H04N 5/781
[52] U.S. Cl. ...................... 386/125; 395/182.05; 386/126
[58] Field of Search ............................. 386/4, 21, 45–46, 386/52, 64, 125–126, 113, 116; 360/13, 15–17; 395/182.05; 369/83–85; 348/7; H04N 5/781

[56] References Cited

U.S. PATENT DOCUMENTS

| | | | |
|---|---|---|---|
| 5,247,347 | 9/1993 | Litteral et al. ............................. | 358/85 |
| 5,530,850 | 6/1996 | Ford et al. ................................ | 395/600 |
| 5,671,386 | 9/1997 | Blair et al. . | |
| 5,720,037 | 2/1998 | Biliris et al. ........................ | 395/200.09 |
| 5,768,623 | 6/1998 | Judd et al. ................................ | 395/857 |

FOREIGN PATENT DOCUMENTS

| | | |
|---|---|---|
| 0 501 818 A1 | 9/1992 | European Pat. Off. . |
| 2 278 228 | 11/1994 | United Kingdom . |

*Primary Examiner*—Wendy Garber
*Assistant Examiner*—Vincent F. Boccio
*Attorney, Agent, or Firm*—Nixon & Vanderhye P.C.

[57] ABSTRACT

Video storage is shown in which stripes of video data, derived from video frames or video fields, are written to respective magnetic storage disks. Each disk is provided with a unique serial number during manufacture and the position of a stripe within an image frame is mapped to these unique serial numbers. In this way, it is possible for the physical locations of the disks within the array to be changed while maintaining correct alignment of the stripes making up each image frame.

35 Claims, 13 Drawing Sheets

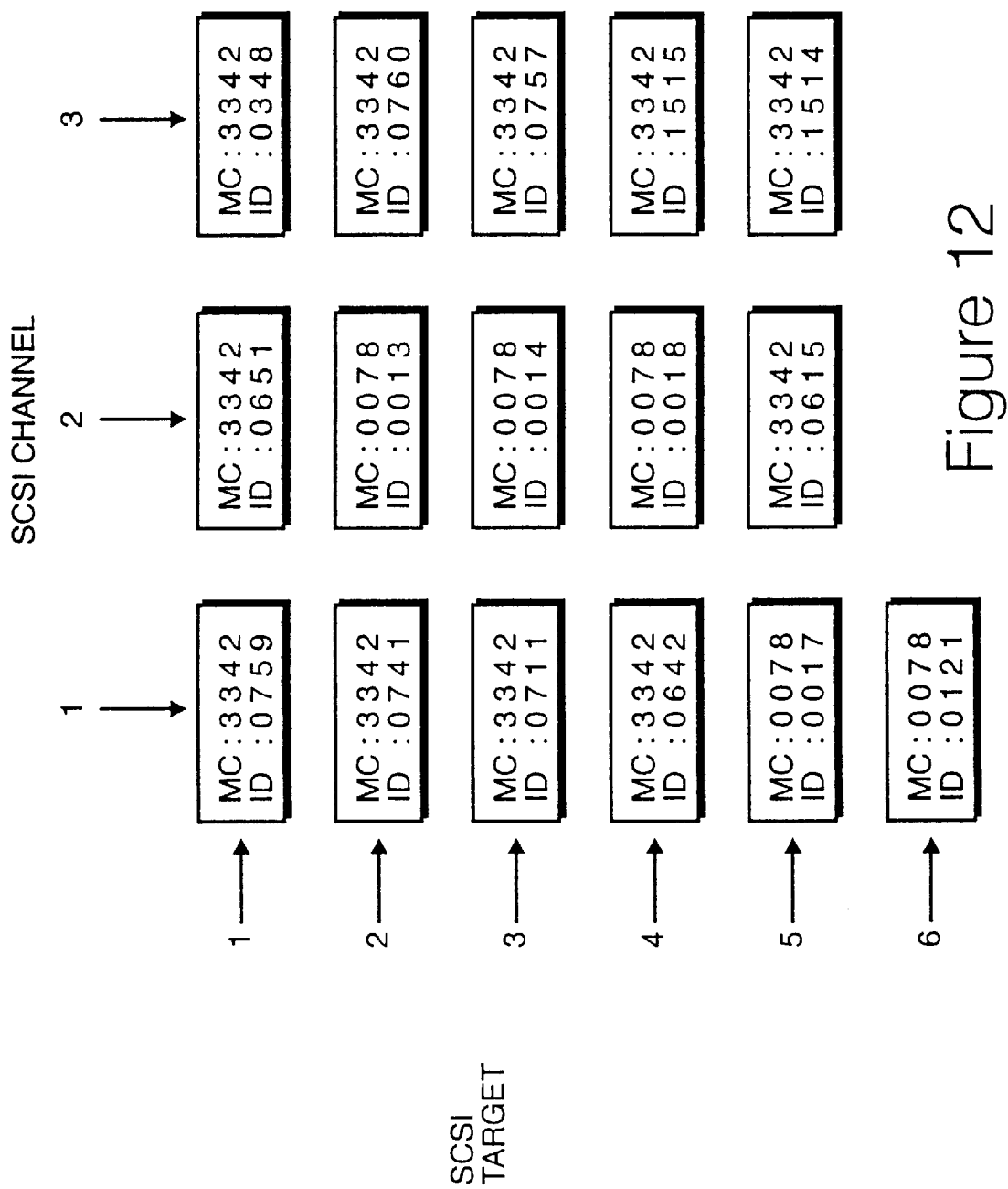

VIDEO DATA STORAGE

This application claims the benefit of U.S. Provisional Application No. 60/615,412, filed on Apr. 15, 1996.

The present invention relates to storing video data on a plurality of co-operating storage devices.

INTRODUCTION

The storage of video data on a plurality of co-operating devices is known in which broadcast quality video is transferred at video rate. Systems are also known for storing data in arrays of inexpensive disks where problems associated with disk failure are compensated by providing data redundancy. The present invention relates to combining these approaches to provide a redundant array for storing video data.

A problem with the storage of video data is that large volumes of data are required to be transferred at high speed, such that the data may be transferred at a rate consistent with the rate at which image frames are displayed, which is referred to herein as display rate. This rate is also known as video rate or real time rate. In order for video to be processed or displayed at display rate it may be transferred at a greater rate but problems will be encountered if the data is transferred at a lower rate. In known systems for storing video data the data tends to be transferred using conventional video protocols at video rate throughout.

When redundant arrays are used for storing video data capable of being transferred at video rate, a substantial number of disks are required in the array. This will inevitably lead to a greater occurrence of disk failure, which can be accommodated if disks are easily replaced and lost data is quickly recovered from the redundant information in a process known as healing.

A problem with this approach is that the position of disks in the array could change, resulting in the stripes making up a video frame being reassembled in the wrong order.

SUMMARY OF THE INVENTION

According to a first aspect of the present invention, there is provided a video data storage apparatus, comprising storage means, transfer means and processing means, wherein said storage means comprises a plurality of storage devices, said transfer means is arranged to transfer video data stripes at a rate at least substantially equally to video display rate, and said processing means is configured to identify unique serial numbers given to said storage devices and to retain a mapping of video stripes to said physical storage devices.

In a preferred embodiment, the processing means maps stripe positions to locations within the physical array to unique physical storage devices.

According to a second aspect of the present invention, there is provided a method of storing video data signals, comprising steps of transferring video stripes to respective storage devices at a rate at least substantially equal to video display rate, and processing data to uniquely identify serial numbers given to said storage devices and to retain a mapping of video stripes to said physical storage devices.

BRIEF DESCRIPTION OF THE DRAWINGS

FIG. 12 details identity codes for an array of the type shown in FIG. 1.

DETAILED DESCRIPTION OF THE PREFERRED EMBODIMENT

Preferred embodiments of the invention will now be described by way of example only with reference to the accompanying drawings identified above.

Figure 1:
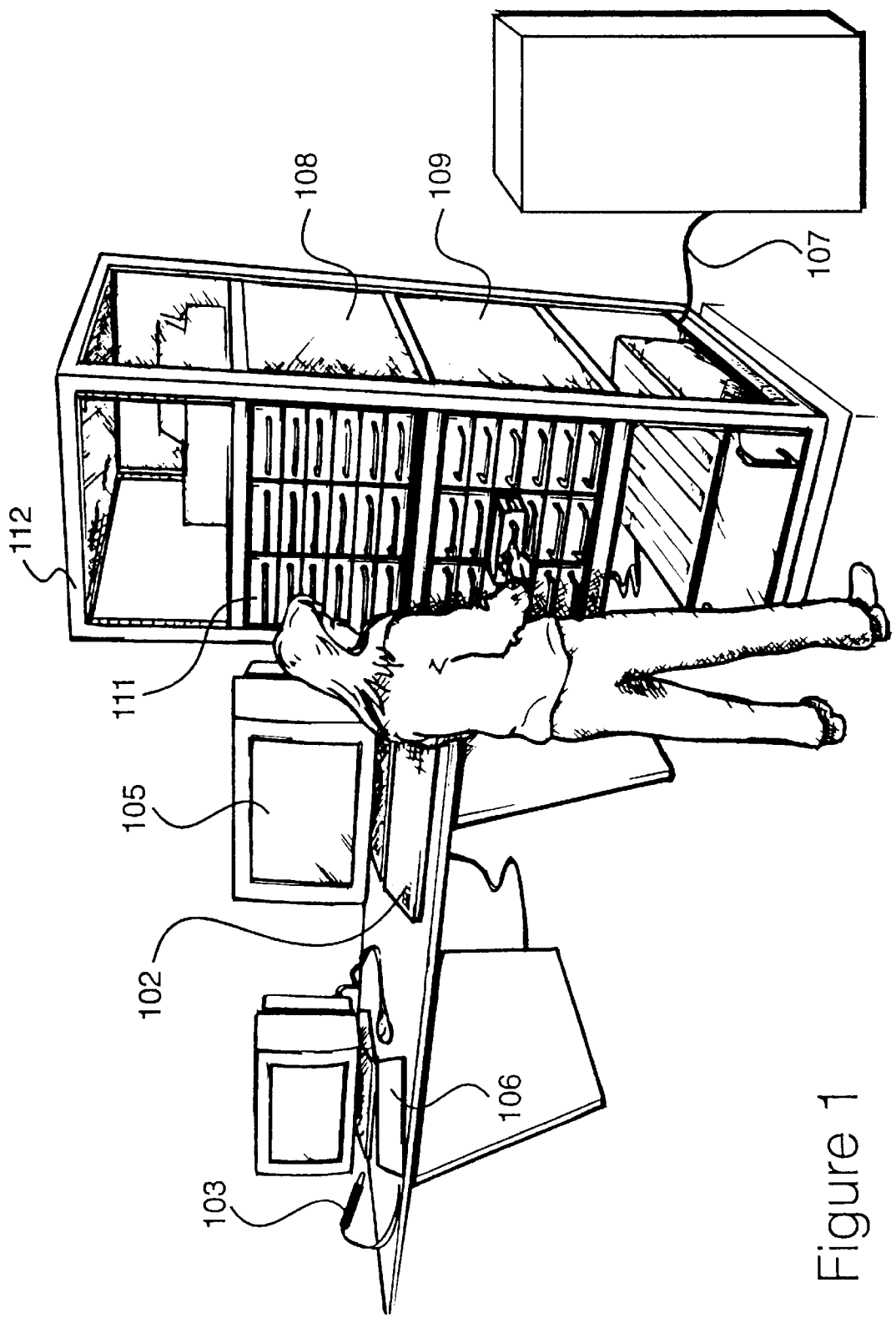
FIG. 1 shows an image data processing environment, including a graphics processor and an array of disk drives.

An image data processing environment is shown in FIG. 1, in which an image processing device 101 receives input commands from manually operable devices, including a keyboard 102 and a stylus 103. In the preferred embodiment, the image processing device 101 is an SGI Onyx, manufactured by Silicon Graphics Incorporated. A video image is displayed on a monitor 105 and modifications, special effects and edits are defined in response to manual operation of said stylus 103 upon a touch tablet 106. The environment may be similar to those marketed by the present Assignee under the trademarks "INFERNO", "FLAME" and "FLINT".

The image processing device 101 includes internal storage, allowing a plurality of image frames to be retained locally for subsequent manipulation and editing. In addition, the image processing device includes a connection 107 arranged to supply image frames at video rate (or higher), thereby substantially increasing the extent to which video manipulations may be effected within the environment, without requiring local data transfers.

Connection 107 consists of a plurality of Fast and Wide Differential SCSI cables connected to two arrays of disk drives 108 and 109. Individual disk modules 111 are housed within a rack 112. It is accepted that, over time, problems will occur with specific disk drive modules 111, either in terms of part of the disk becoming damaged or the entire disk module 111 becoming totally inoperable, a condition often referred to as a "head crash". The disks are therefore configured as a redundant array of inexpensive disks (RAID)

such that parity data is generated when data is written to the array, allowing any individual disk to be replaced if a head crash occurs without any data actually being lost.

As shown in FIG. 1, a damaged disk is removed from the array for replacement with a similar unit. Procedures are then invoked to read parity data, in combination with all of the remaining image data, so as to reconstitute the lost data and to re-establish the data in the array as being protected against similar future drive malfunction.

Figure 2:
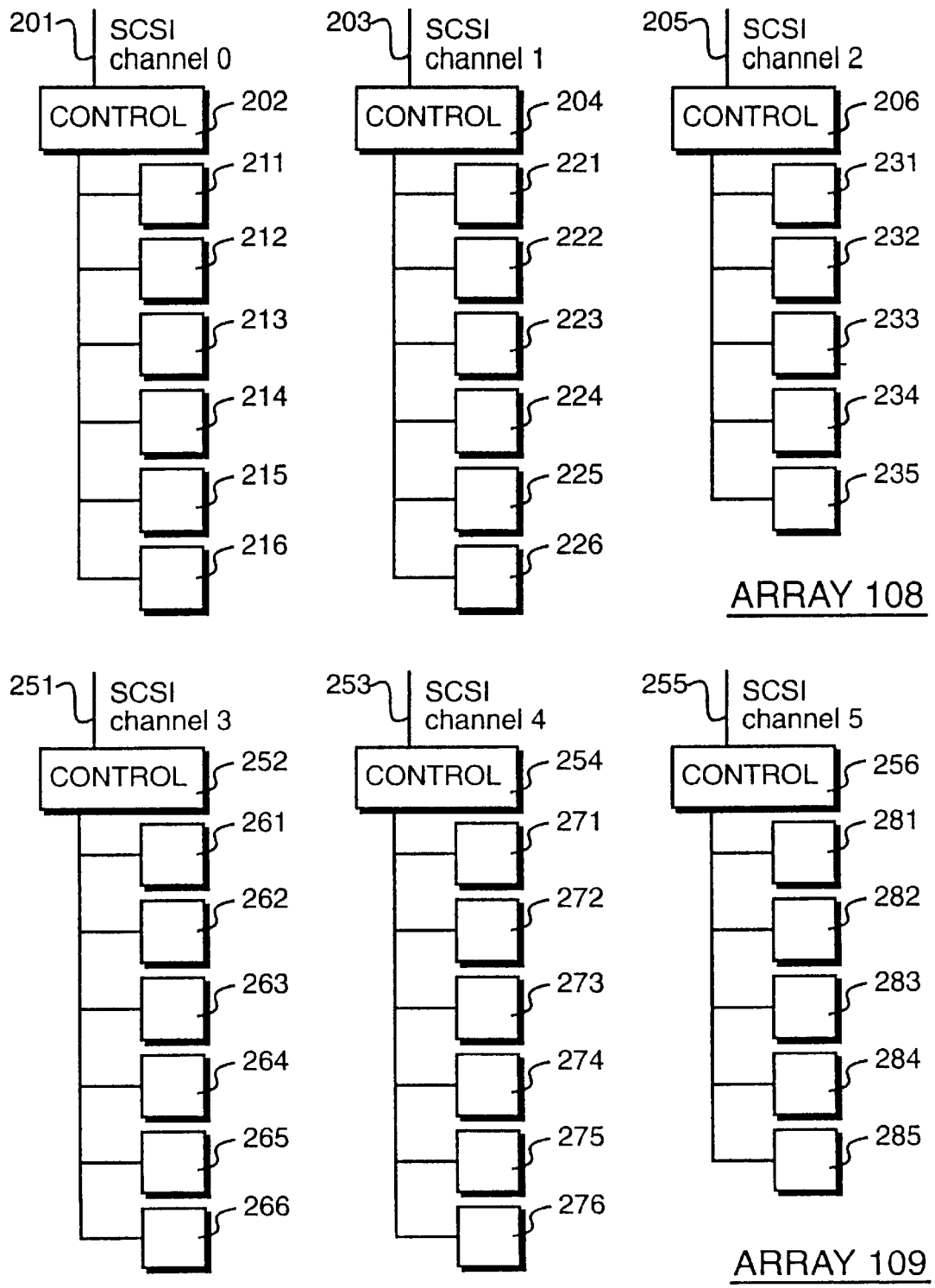
FIG. 2 details the arrangement of the array of disk drives shown in FIG. 1, including individual disk drives.

Configuration of the disk drive arrays 108 and 109 shown in FIG. 1 is detailed in FIG. 2. Array 108 is connected to three SCSI channels. SCSI channel 0, 201, is connected to control circuitry 202. SCSI channel 1, 203, is connected to control circuitry 204. SCSI channel 2, 205, is connected to control circuitry 206. Control circuitry 202 supplies and receives SCSI control and data signals to and from an array of six high capacity hard disk drives, 211, 212, 213, 214, 215 and 216, each having a capacity of two gigabytes of data. The control circuitry 202 and each of the six drives connected to control circuitry 202 is considered as being a SCSI target. The control circuitry is considered as being target zero, drive 211 is target one, drive 212 is target two, drive 213 is target three, drive 214 is target four, drive 215 is target five and drive 216 is target six.

Similarly, SCSI channel 2, 203, communicates with control circuitry 204 and drives 221, 222, 223, 224, 225 and 226, considering these as targets zero to six respectively. SCSI channel 2, 205, similarly communicates with control circuitry 206 and drives 231, 232, 233, 234 and 235.

The array 108 may be considered as comprising a main disk array in which there are three columns and five rows, making a total of fifteen disks. The remaining two disk drives, 216 and 226, are used for parity information and as a spare disk respectively. The parity information may be used to reconstruct data which is lost from a drive in the array, and the spare disk 226 may be used to replace a drive which has suffered a major fault, such as a head crash.

Also shown in FIG. 2 is array 109. This comprises an identical arrangement to that which is shown for array 108, with the exception that connections are made via different SCSI connections. These are SCSI channel 3, 251, SCSI channel 4, 253 and SCSI channel 5, 255. Thus control circuitry 252 is considered as target zero on SCSI channel three, controlling drives 261, 262, 263, 264, 265 and 266, which are considered as being SCSI targets one to six respectively. Control circuitry 254 is considered as being target zero on SCSI channel 4, and drives 271, 272, 273, 274, 275 and 276 are considered as being SCSI targets one to six respectively. Control circuitry 256 is considered as target zero on SCSI channel five, with drives 281, 282, 283, 284 and 285 as SCSI targets one to five. Drive 266 is used to store parity information, and drive 276 is spare.

Figure 3:
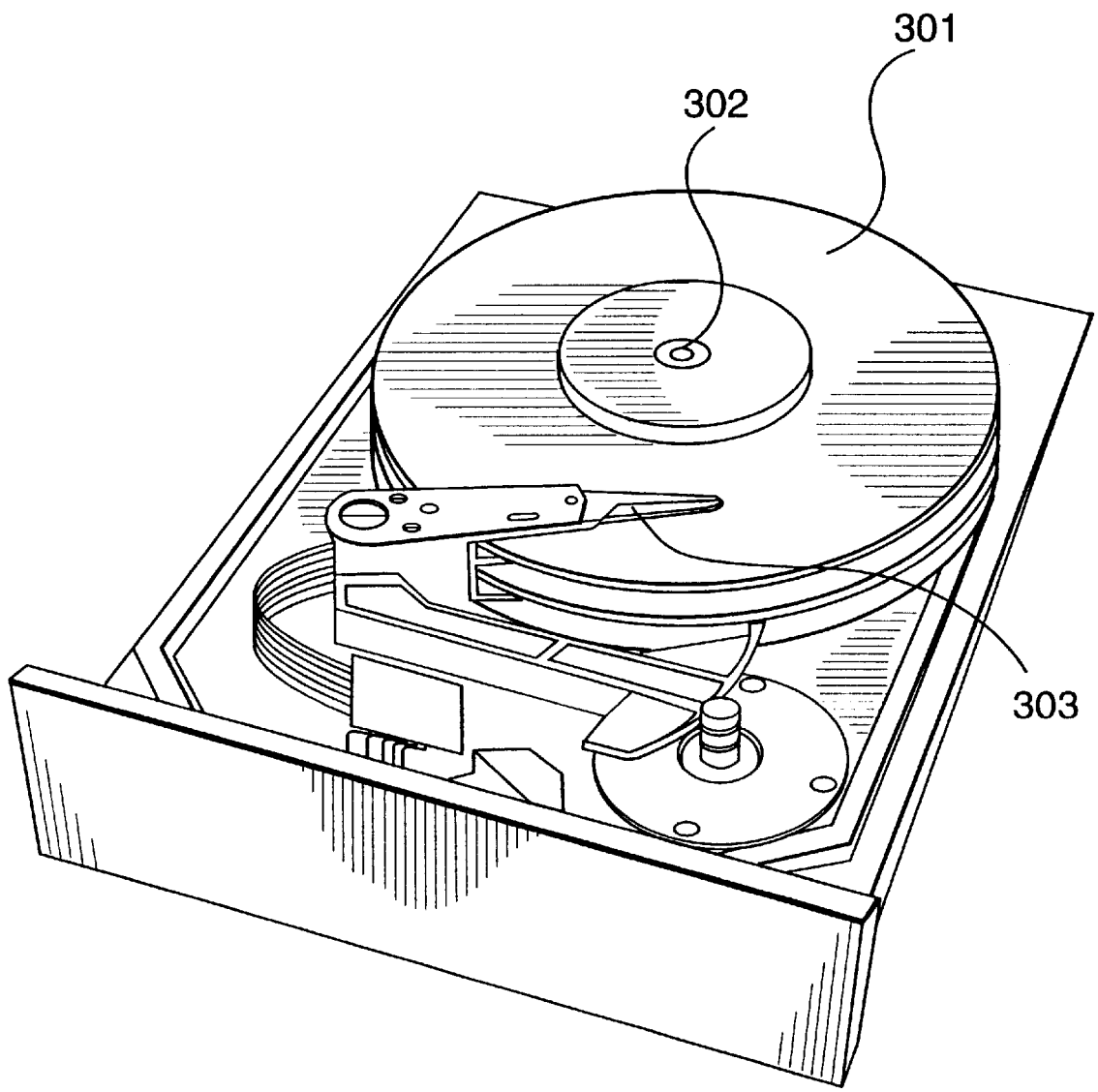
FIG. 3 details an individual disk drive of the type identified in FIG. 2.

A disk drive unit 111 of the type shown in FIG. 1, and indicated in FIG. 2 is illustrated in FIG. 3, having outer casing and seals etc. removed. The disk comprises a rotatable magnetic medium 301 arranged to rotate about a drive shaft 302. The disk is accessed by means of a head 303, arranged to be supported by a cushion of air generated by the rotating velocity of the disk 301 below it. Information on the disk 301 is formatted as a plurality of tracks and sectors and a data access is made by moving the head 303 radially across the disk to the particular circumference at which data is to be written to or read from the disk. The time taken for data to be written to the disk or read from the disk may be considered as being made up of three components. Firstly, it is necessary for the head 303 to traverse radially across the disk in order to locate itself at the appropriate sector for data transfer. Secondly, data transfer can only take place when the disk has positioned itself such that the start of the appropriate sector is directly below the transfer head. Finally, the actual data transfer takes place involving a magnetic interaction between the recording medium 301 and the head itself. If large data transfers occur, using relatively large regions of disk, the time taken for such a transfer to occur will be predominantly dependent on the third component, with the first and second components being relatively small.

However, as the area of interaction on the disk becomes smaller, the duration required in terms of the first and second components becomes relatively large, such that the perceived transfer rate will be influenced not so much by the actual rate at which data may be transferred to or from the disk, but in terms of the time taken for the head to traverse across the disk and for the appropriate start of the data to reach the position of the head over the disk.

In known systems it is necessary to define the striping of discs at a stage of system configuration. System configuration is a major undertaking, and cannot be performed on a daily basis. Indeed, the complexity of system configuration is such that it is to be avoided except when it is absolutely essential, such as when a new graphics processor has been purchased and it is necessary to define the striping of disks for all anticipated uses of the disc array.

Figure 4:
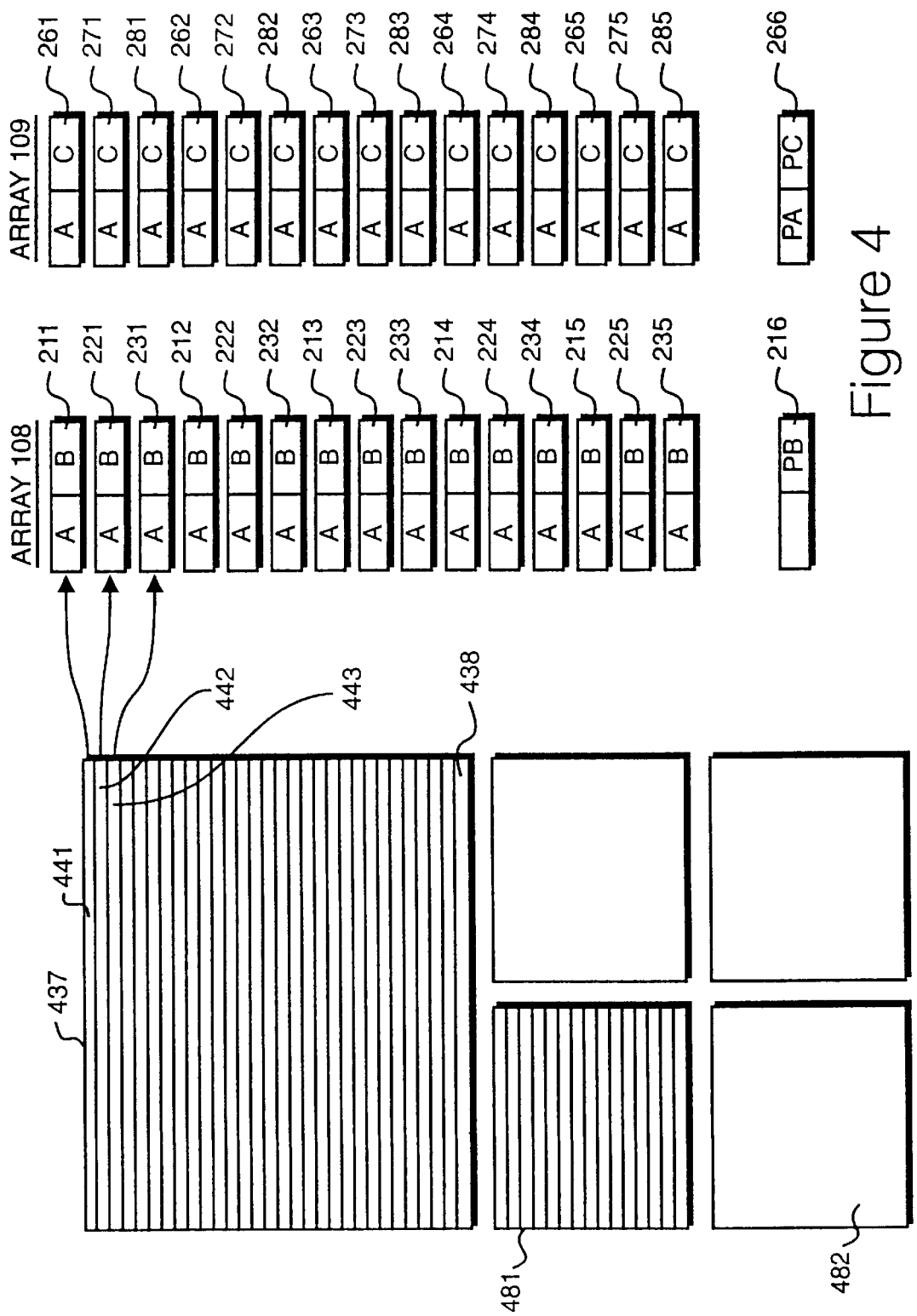
FIG. 4 illustrates frames of image data being striped over the array shown in FIG. 2.

Furthermore, in known systems, the striping of disks for use with particular data formats, such as broadcast quality video frames of NTSC and HDTV, requires that the disks are logically partitioned. Striping, and its relationship with disk partitions, is shown in FIG. 4.

A frame of high definition television (HDTV) data 437 is conceptually split into stripes, 441, 442 and 443. Each stripe is supplied to a separate disk drive 211, 221 and 231. The same stripes from preceding and successive frames are sent to these same drives. Thus, although each drive has data capacity for a number of frames, stripes are stored across several drives in order to facilitate the high speed of data transfer that is required for television signals. In the example shown in FIG. 4, HDTV signals are stored on areas of disks designated with the letter A. Thus an area A of each disk has been assigned to the storage of HDTV frames 437.

In a typical video editing studio, more than one type of television signal will be used, depending on the job in hand. Thus, it makes sense to designate an area of each disk for another type of storage, for example NTSC video frames. An NTSC video frame 481, split into stripes, is also shown in FIG. 4. In disk drive array 108, half of each disk has been assigned for storage of HDTV frames, A, and the other half has been designated for storage of NTSC frames B. This allocation is known as a partition, and is fixed at the time of system installation. Thus drive 211 is partitioned into two areas, A and B, for the exclusive use of HDTV and NTSC frame data, respectively.

HDTV frames require considerably more bandwidth for display in real time than NTSC or PAL frames. Thus, although an NTSC frame may be read at sufficient speed from an array 108 of fifteen striped disks 211 to 235 plus parity 216, HDTV frames must be striped over thirty striped disks: 211 to 235 and 261 to 285 plus parity 266, in order to attain the necessary high bandwidth. Thus two drive arrays 108 and 109 are required. The drives in the second array 109 are striped for use by a third data type, C, for example PAL television signals 482, or some other type of high bandwidth data.

Partitioning of the arrays into areas A, B and C is performed when the system is initially configured, and does not take into account the day-to-day variation in data types which will be experienced when the system is in use. Thus, on days when no HDTV editing is to be done, half of the available disk space is unavailable. Given that such an array is expensive, existing solutions provide an inefficient method of allocating disk space.

The drives in the array are permanently partitioned into a single logical area, as opposed to the several areas A, B and C of known systems. The maximum bandwidth required from the array is taken into consideration, and a fixed number of stripes is defined. For example, if the system has to cope with HDTV signals, it will be necessary to define the number of stripes as being set to thirty. Alternatively, if only NTSC, PAL and lower bandwidth signals, such as JPEG2, are to be encountered, the number of stripes may be preset to fifteen.

Figure 5:
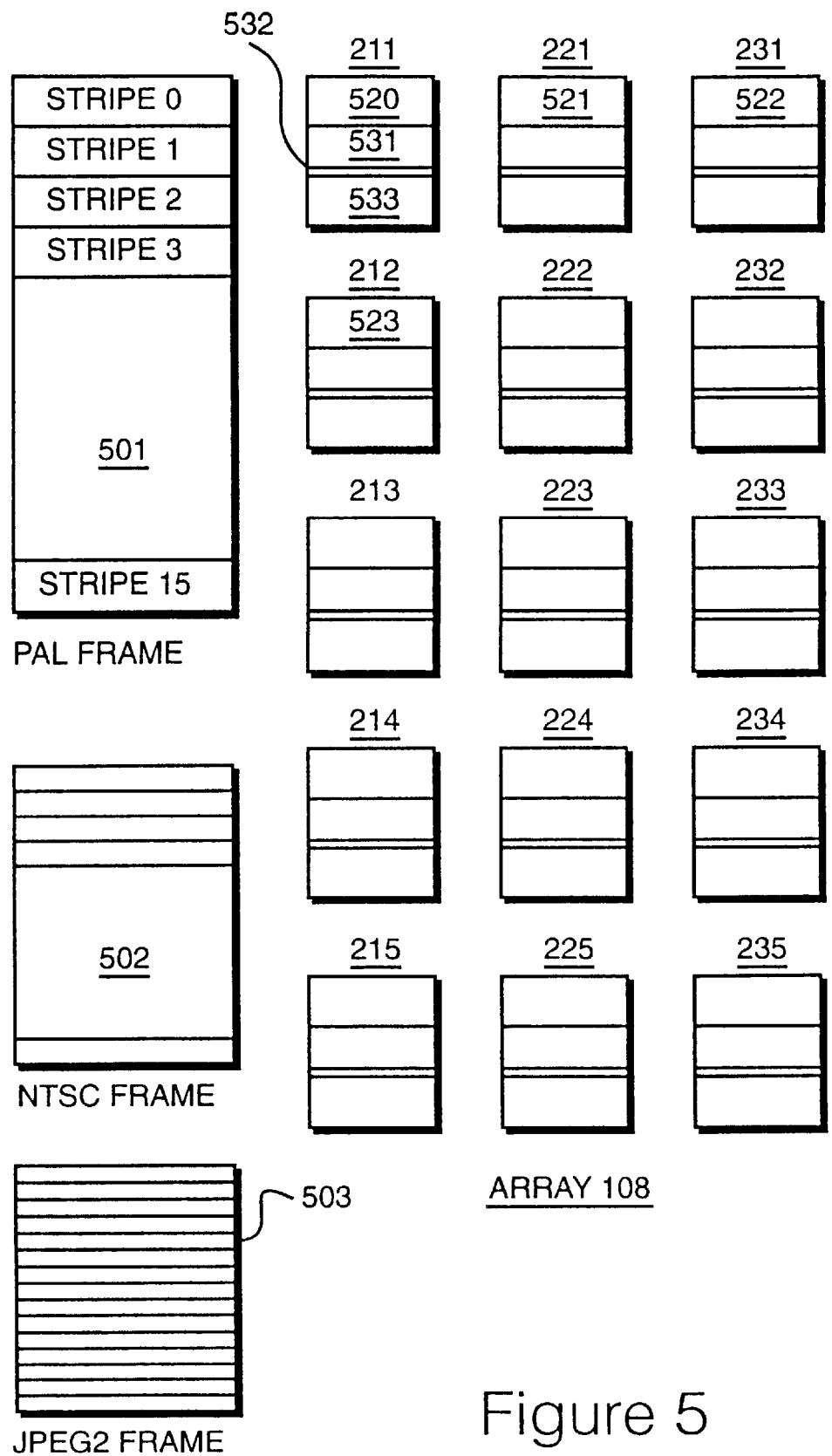
FIG. 5 shows an improved distribution of data over the disk array shown in FIG. 2.

Each frame of video data is divided up into the same number of stripes by the graphics processor 101, regardless of the amount of data in a frame. Thus the size of each stripe, or the striping interval, depends on the amount of data required for a particular frame. An example of a system using a fixed number of fifteen stripes is shown in FIG. 5. An incoming PAL frame 501 is split into fifteen equal sized stripes. Each stripe is supplied to a different drive in the array 108. Thus, stripe 0 from frame 501 is supplied to disk drive 211 and is to are in area 520. Stripe 1 from frame 501 is supplied to area 521 on disk drive 221. Stripe 2 from frame 501 is supplied to area 522 on disk drive 231, stripe 3 from frame 501 is supplied to area 523 on disk drive 212, and so on. Stripes are written substantially simultaneously to all fifteen drives in order to achieve the required high video bandwidth.

Frame 502, shown in FIG. 5, is from an NTSC image data source, requiring slightly less storage than the PAL frame 501. This is also stored as fifteen equal length stripes in the drive array 108. But in this case, each stripe 531 will be slightly shorter than each stripe 520 for the PAL signal. A JPEG2 source frame 503 requires less storage than either the PAL frame 501 or the NTSC frame 502. This also is split into fifteen equal length stripes 532 for storage on the fifteen drives in the array 108.

Thus, as each incoming frame is supplied to the array 108, a different length of stripe is selected in accordance with the amount of data in each frame. Certain video frame data will include preceding data which indicates the amount of data to follow which will make up a single frame. In this case, it is possible for the graphics processor 101 to divide up image data as it is transferred to the drive array 108 into stripes of the required size, such that fifteen stripes will be used to store the frame. Alternatively, some video sources will not have their frame data size defined before the data is received. In this case it is necessary to buffer the data for the individual frame, measure the size of the data once the frame is completely received, and then allocate a stripe size accordingly. The frame is then transferred from the buffer to the drive array as fifteen correctly sized stripes. Preferably, procedures for manipulating video images include means or procedures for measuring and identifying a frame size before a frame is supplied to a drive array, such that the striping interval may be adjusted without the need to buffer frame data.

Figure 6:
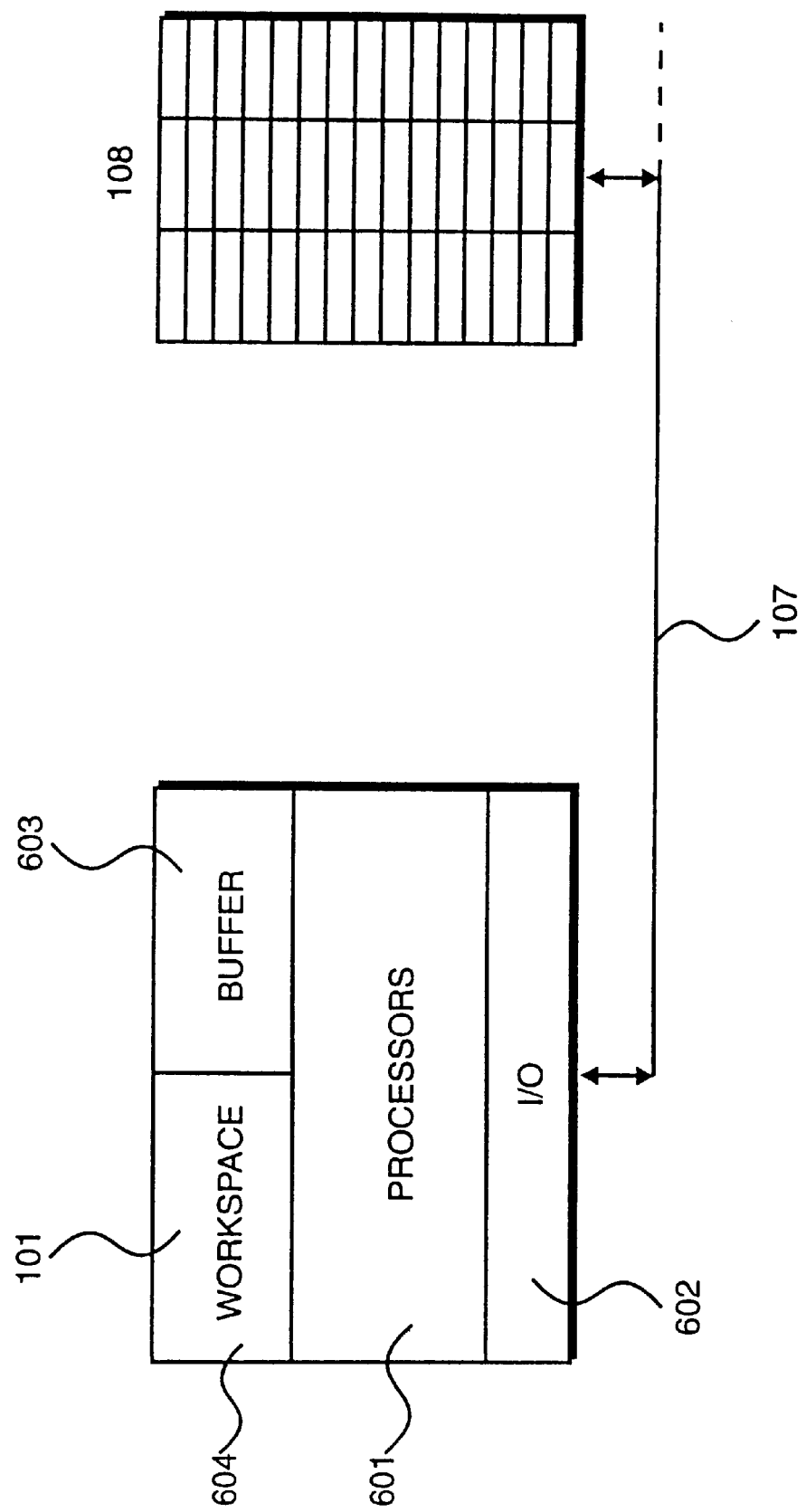
FIG. 6 details the graphics processor shown in FIG. 1.

Details of buffering arrangements for frames of unspecified video frame data sizes are shown in FIG. 6. The graphics processor 101 includes processors 601 and input and output interface circuitry 602 connected to drive arrays such as array 108 via SCSI connections 107. Also included in the graphics processor is an area of memory 603 for buffering image data in order to measure its size before a stripe size is defined. Other memory areas in the graphics processor 101 are used for workspace 604, which is required for intermediate calculations during typical image editing operations.

Typical disk operations are performed in data blocks of 512 data bytes. Thus, each stripe comprises an integer number of these data blocks, even though some degree of wastage may occur.

As shown in FIG. 5, each of the fifteen main drives in the array 108 includes the same subdivision into stripes, but the stripe size is variable. Thus a mechanism is provided by which it is possible to use whatever data space is available in the drive array for whichever format is currently being edited, while maintaining the high bandwidth required for real time image transfer. The subdivisions of the drives shown in FIG. 5 are for diagrammatic purposes only, and many frames of each type of signal may be stored on the array. Thus, in addition to the stripes shown, the pattern of striping would be repeated several times, depending on the number of frames of each type which are stored. Thus, one may consider area 533 on drive 211 to be stripe 0 of the second PAL frame, whereas area 520 is stripe zero of the first PAL frame, and so on.

The example shown in FIG. 5 shows the case for a system set up to provide fifteen stripes. In the case of HDTV editing, this will not provide sufficient bandwidth. Thus, in an alternative arrangement, a combined array of thirty disks plus parity and spare disks, or more, is used, with all frames divided up into thirty stripes or more, the size of the stripes being variable in response to the received image frame data size when writing to the combined array, but the number of stripes being fixed.

Furthermore, video frame data may be considered as a specific instance of high bandwidth data. Thus, the apparatus may be arranged to consider video frames as blocks of data, and other types of data blocks may be advantageously stored.

A problem exists with the solution described so far, in that variable striping intervals have correspondingly variable degrees of speed efficiency with respect to the access times of the hard disks in the array. Thus, while it is necessary to stripe over thirty drives in order to attain the desired bandwidth for an HDTV signal, striping over thirty disks for a much lower bandwidth signal results in a small amount of data being supplied to each disk in the stripe. When small amounts of data are written to each disk, the head access times, which are in the order of several milliseconds, will predominate over the time taken to transfer the small amount of data, thereby reducing the theoretical efficiency of this system.

The level of efficiency becomes particularly important if the same drive array or arrays is being used by several operators to manipulate images of different bandwidths. This puts the drives in the array under considerable pressure, in that the number of random head movements that are necessary will be increased dramatically. Thus, it is possible for the workload of the system to be restricted unnecessarily by the large number of stripes which are used for small bandwidth image data. Furthermore, disk drive failure is related to the frequency of disk head movements, and it would therefore be advantageous to reduce striping inefficiency for this reason.

In the preferred embodiment, the system is initially configured in accordance with the minimum bandwidth which it is necessary to process. Typically, the smallest bandwidth signal is that used for compressed image proxy frames. These are used to represent higher definition signals, such as NTSC, PAL, or possibly film, at a lower bandwidth, such that images may be displayed on a lower cost graphics workstation, such as a Silicon Graphics Indigo, while maintaining full editorial control over the original high bandwidth image frames.

For example, a sequence from an NTSC image file may be converted into proxy form, for display on a monitor. Video editing personnel may then construct a series of edit decisions, based on what is viewed on the monitor at a low resolution. This may involve re-ordering various parts of the video sequence and so on. Based on these edit decisions, the results may be previewed, again at reduced resolution. Finally, once the edit decisions have been finalised, they may be applied to the full bandwidth signal, which is not viewable on the monitor. A typical compressed image proxy has half the vertical resolution and half the horizontal resolution of its respective high definition original. This results in a bandwidth reduction of a factor of four.

Compressed image proxies from NTSC or PAL originated data may be efficiently striped across four high capacity hard disks. It is this number which is then used as the basis for configuration of the disk array. The combination of the four disks is considered a sub group. Each sub group of disks includes an additional dedicated parity disk, thus, in this example, each sub group requires five disks. Higher bandwidth signals are striped across integer multiples of sub groups. The combination of sub groups used for striping an individual frame is called a group. The array of drives includes an integer number of sub groups, plus one or a number of spare drives.

As frames are processed by the graphics processor 101 for subsequent storage in an array of drives 108 and 109, the frame is allocated an integer number of sub groups over which it will be striped. Thus, a level of striping efficiency is maintained across multiple data bandwidths, without the need to pre-define a particular area or set of disks for use with a particular type of image or block of data.

Thus, in accordance with the description so far, it becomes possible to operate a large disk array for use with a variety of data bandwidths while retaining reasonable efficiency. A typical use for such a system is in an editing studio where more than one editing terminal is in use. For example, a first operator may require access to the disk array while performing digital editing of NTSC video frames. In the course of likely editing events, it is sometimes the case that two frames are required simultaneously. An example of this requirement is when a smooth crossfade is made from one image source to another. Throughout the duration of the crossfade, two NTSC data streams are required.

In the meantime, a second operator may be in the process of editing a High Definition Television sequence of frames. While the system described so far theoretically provides sufficient bandwidth for all this to occur simultaneously, in practice, due to implementation details, some frames may be delayed, resulting in a temporarily frozen display during a full motion sequence.

Figure 7:
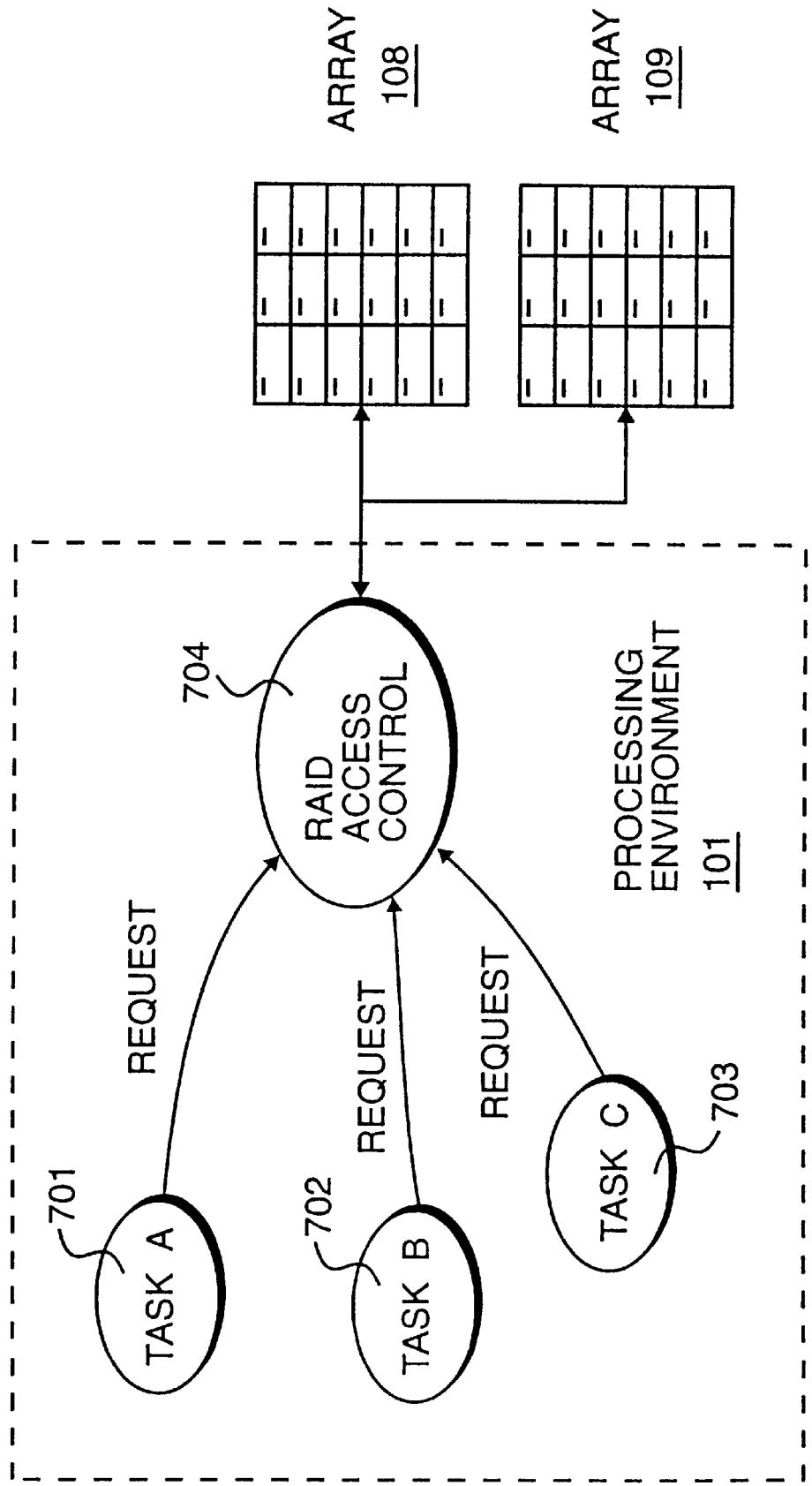
FIG. 7 details requests during a plurality of editing processes operating on the graphics processor shown in FIG. 1, including a RAID access control process.

The problem is illustrated in FIG. 7. Three data processing processes or tasks 701, 702 and 703 are shown which operate in the processing environment of the graphics processor 101. Each of the tasks makes a request for access to the disk array 108 and 109. This request is made via a RAID access control process 704, which is part of the operating system of the graphics processor 101. The RAID access control process 704 supervises access and data transfer between the RAID array, 108 and 109, and the graphics processor 101.

Figure 8A:
FIG. 8A details a timing of disk accesses allocated to the editing processes shown in FIG. 7.

The result of this arrangement is shown in FIG. 8A. The first task which requests access to the disk array is given control for the time requested by the task. In the example shown, task A 701 is the first task to make such a request. A request made by task B 702, shortly after the request made by task A 701, is delayed until the transfer requested by task A 701 is complete. A request made by task C 703 shortly after the request made by task B 702 is delayed even longer, as it has to wait until task B has completed its requested transfer.

Although the transfers requested by each of the three tasks may only be for a single frame, their unpredictability may cause a frame to be delayed by a fraction of a frame interval, or possibly more, if enough such requests are allowed to build up.

Figure 8B:
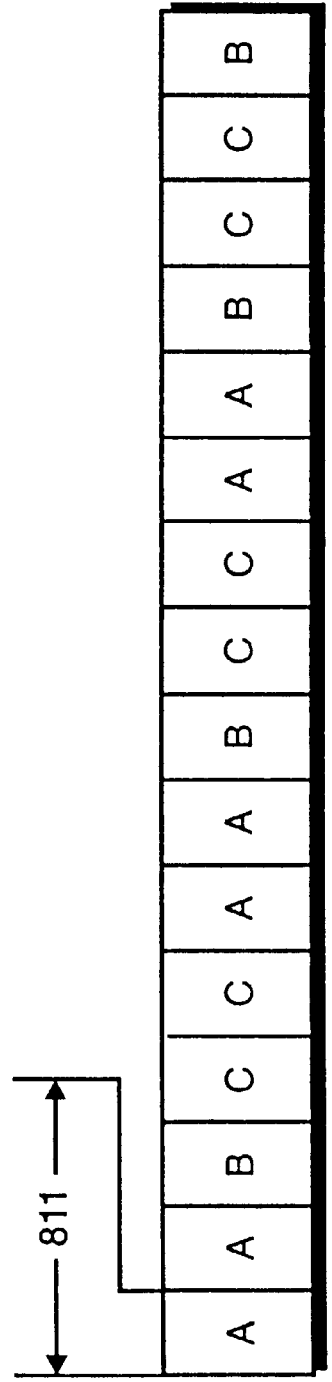
FIG. 8B details an improved timing of disk accesses allocated to the editing processes shown in FIG. 7.

The instantaneous data transfer rate between a task and the disk array is much higher than the average bandwidth of the data that is required, and this fact makes a solution possible. FIG. 8B identifies an improved timing arrangement in response to the requests made by tasks A, B and C shown in FIG. 7. In FIG. 8B data transfer begins soon after any request is made, but is left incomplete because other requests are pending. The delay between a request being made and the first data transfer occurring is affected by the time 811. The time 811 is chosen so as to optimise the relationship between transfer delays and the processing overhead required at the border between each transfer.

Figure 9:
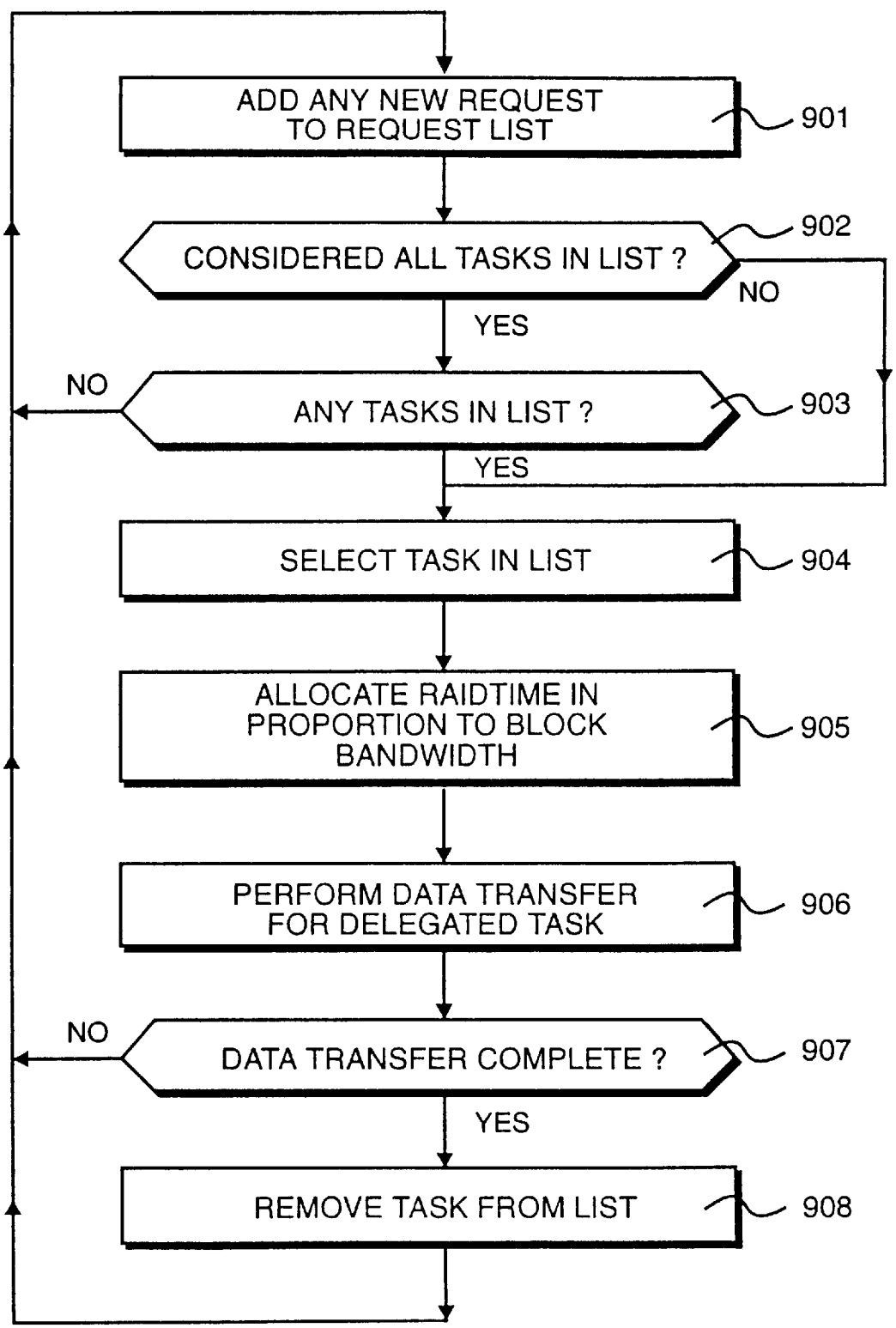
FIG. 9 details the RAID access control process shown in FIG. 7, including a process for adding requests to a request list.

Processes in the RAID access control process 704 for effecting the improved timing arrangement shown in FIG. 8B are detailed in FIG. 9. The processes shown in FIG. 9 may be considered as a continuous loop running in the processing environment of the graphics processor 101. In process 901 any new requests made by tasks running in the processing environment 101 are added to the request list. In practice, there is a limit to the number of requests which may be held in the list at the same time, which is dictated by the total bandwidth required for the transfers which have been requested. Typically, however, this limit is not exceeded, as the limitations of the system will be known by the operators in advance of its use.

In process 902, a question is asked as to whether all tasks in the list have been considered. If the result of this is yes, control is directed to process 903, where a question is asked as to whether there are any tasks in the list. If the result of this question is no, control is directed to process 901, and processes 901, 902 and 903 are repeated until a task actually makes a request.

If the result of process 902 is no, or the result of process 903 is yes, control is directed to process 904, where the next task in the list is selected for consideration. If there is only one task left in the list, this task will have its transfer performed continuously. In process 905, access to the RAID array is allocated in proportion to the bandwidth of the data being transferred. If this proportional allocation is not performed, higher bandwidth data would be delayed proportionally longer than low bandwidth data.

In process 906 the data transfer for the selected task is performed over the allocated time. In process 907 a question is asked as to whether the data transfer is complete. If not, control is directed to process 901, and other tasks in the list will be considered before the remaining data is transferred. Alternatively, if the requested data transfer for currently selected task has been completed as a result of process 906, the task is removed from the list in process 908. Thereafter control is directed to process 901, so that the remaining tasks in the list will continue to be allocated transfer times, until those transfers are completed. Under heavy use, more tasks will be added to the task request list before the list has completely emptied, so as old transfer requests are removed, new ones are added, at a roughly equal rate.

Figure 10:
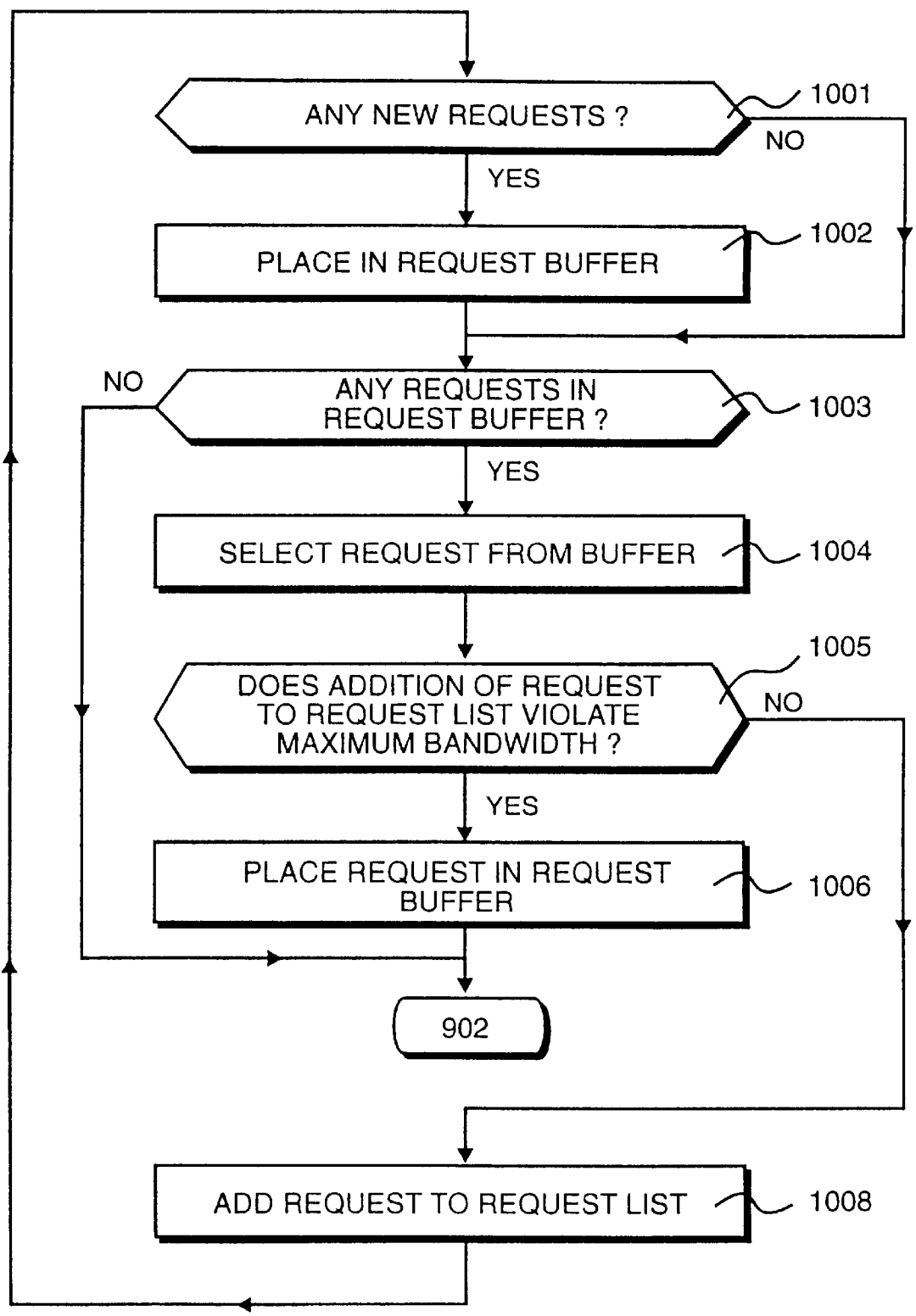
FIG. 10 details the process for adding requests to a request list shown in Figure.

The process 901 shown in FIG. 9 for adding new requests to the request list is detailed in FIG. 10. In process 1001 a question is asked as to whether a task has made a new request for data transfer. If the result of this is no, control is directed to process 1003. Alternatively, control is directed to process 1002, where the request is placed in a first in first out request buffer. Thereafter control is directed to process 1003. In process 1003 a question is asked as to whether there are any requests in the request buffer. If the result of this question is no, control is directed to process 902 shown in FIG. 9. Alternatively, control is directed to process 1004, where a process is selected from the request buffer, and at the same time removed from the request buffer.

In process 1005, a question is asked as to whether the addition of the currently considered request to the request list, operating in FIG. 9, would violate the maximum bandwidth of the system. If the result of this is yes, control is directed to process 1006, where the request is returned to the request buffer, for reconsideration at a later time. Thereafter control is directed back to process 902 in FIG. 9. Alternatively, if bandwidth is available, the request is added to the request list in process 1008. Thereafter, processes 1001 onwards are repeated until either all outstanding requests have been added to the request list, or there is not enough bandwidth to add another request.

The time taken for the head on each disk drive to access the first byte of data in a contiguous block varies depending on the distance the head has to move. Disk drives have two head access times: track or cylinder access time and sector access time. Of these the track or cylinder access time is usually the greater. Each track is a concentric circular path on the rotating disc upon which data is written. When several disks are stacked upon each other in the same drive, as is the case with high capacity drives, the same track on each different disk may be imagined as intersecting an imaginary cylinder. It is for this reason that the term cylinder is sometimes used interchangeably with the term track.

The track access time is determined by the speed at which the head can be accurately positioned to a requested track. The sector access time is the time that elapses before the correctly positioned head reads the sector header pattern rotating beneath it. This depends on the speed of rotation of the disk and the number of sectors on each concentric track. Once the disk head has been correctly positioned, data can be read or written at a high speed, so it is particularly important to minimise the ratio of time spent positioning the head to the time spent reading or writing the data.

Figure 11A:
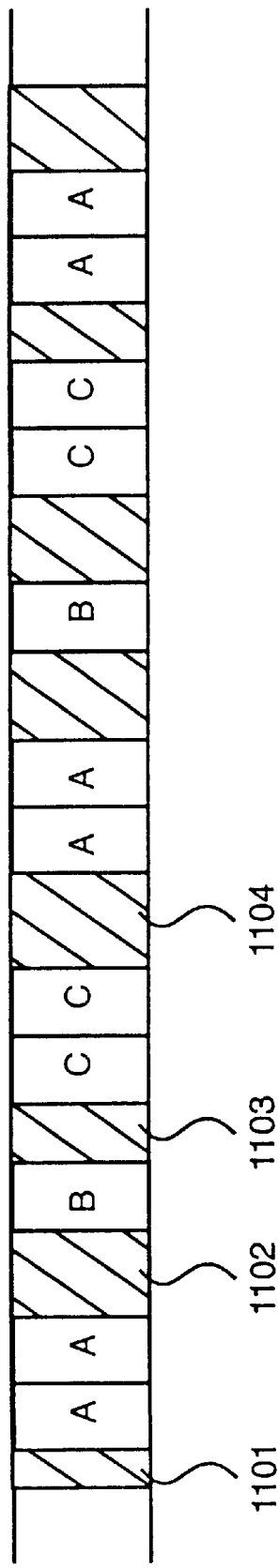
FIG. 11A shows timing of disk accesses allocated to the editing processes shown in FIG. 7, including head access times.

When head position is not taken into account, the true timing diagram for data access shown in FIG. 8B may look more like the one shown in FIG. 11A. A small head access time 1101 precedes the first batch of data which is read for task A. However, the data for task B is a significant number of tracks distant from the data for task A, so a long head access time 1102 is required before the correct sector is located. The data for task C is located not far from the data for task A, but because the data for task B was distant from the data for task A, the head must repositioned again, taking time 1103 to find the correct sector. Movement of the head from the last sector written to by task A to the first sector for task B requires head access time 1104.

Figure 11B:
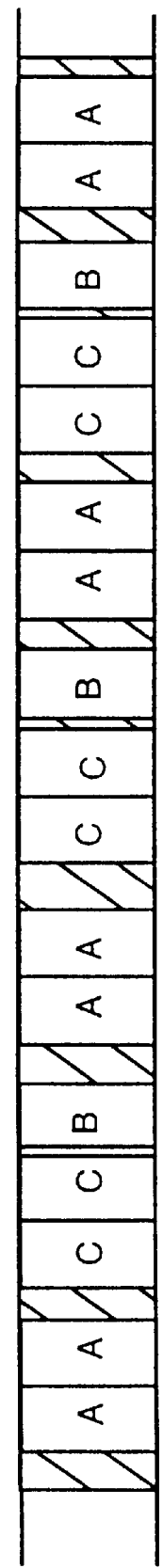
FIG. 11B shows timing of disk accesses allocated to the editing processes shown in FIG. 7, including reduced head access times.

By taking into consideration the physical locations of sectors on the disk, it is possible to improve overall data bandwidth with only a slight increase in delay to access. FIG. 11B shows a re-ordering of task access, thereby achieving a significant overall increase in throughput. In the example shown, it is known that the tracks required for task C lie between the tracks for tasks A and C. Thus the task access order is A,C,B. This results in removal of unnecessary head movements, and thereby increases the overall available bandwidth of the drive array.

Disk arrays of the type shown in FIGS. 1 and 2 typically undergo heavy use, eventually resulting failure of one of the disk drives. Known principles of RAID architectures provide the facilities for reconstructing data which may have been lost during such a failure. Known standards for such data reconstruction include RAID 2 and RAID 3. Once any particular drive has completely failed, however, it is necessary to replace the damaged drive with a spare before the data can be restored to its fully protected condition. This must eventually be done by physical removal of the damaged drive and replacement with a new one. Data is then reconstructed and written to the new drive.

A preferred alternative is to allow the RAID to select a pre-connected spare drive, and to logically re-map the stripes or sub-groups with which it communicates. At a convenient later point in time, the spare disk may be physically removed and placed in the physical location of the previously damaged disk. Thus it is necessary during such a process to track the logical and physical locations of a disk drive.

Furthermore, it is known that large drive arrays may be transported conveniently by storing each disk unit separately, as their combined weight is considerable. Thus, during reconstruction it would be necessary to reconstruct the array with each disk in its original position, in order to retain the data contents correctly. Given that some arrays may include as many as forty-five disks or more, this represents an annoying administrative process which may delay quick and reliable installation of valuable equipment.

High capacity disk drives include electronic identification codes which may be read via a SCSI interface by the host graphics processor. Typically, a drive unit has a thirty-two bit manufacturers code and an identity code. The combination of these provides a unique identification for each disk drive in the array. When initially configuring the array, drives may be placed at random, as shown in FIG. 12. In FIG. 12 each drive is shown having a manufacturers code MC and an identity number ID. Drives from two different manufacturers are shown, having manufacturers codes 3342 and 0078 respectively. Thus each drive in the array may be uniquely identified by the combination of these codes.

A spare disk is available on SCSI channel 1 at SCSI target 6. This may be logically swapped with a faulty disk drive when a failure occurs. As described earlier, drives are striped according to sub-group intervals. Thus each sub group has associated with it a number of drives, each having a unique identity, defined by the manufacturers code and the identity number. Workspace memory 604 in the graphics processor 101, as shown in FIG. 6, includes mapping tables which define the identity, physical and logical connection of each disk in each sub group.

Figure 13:
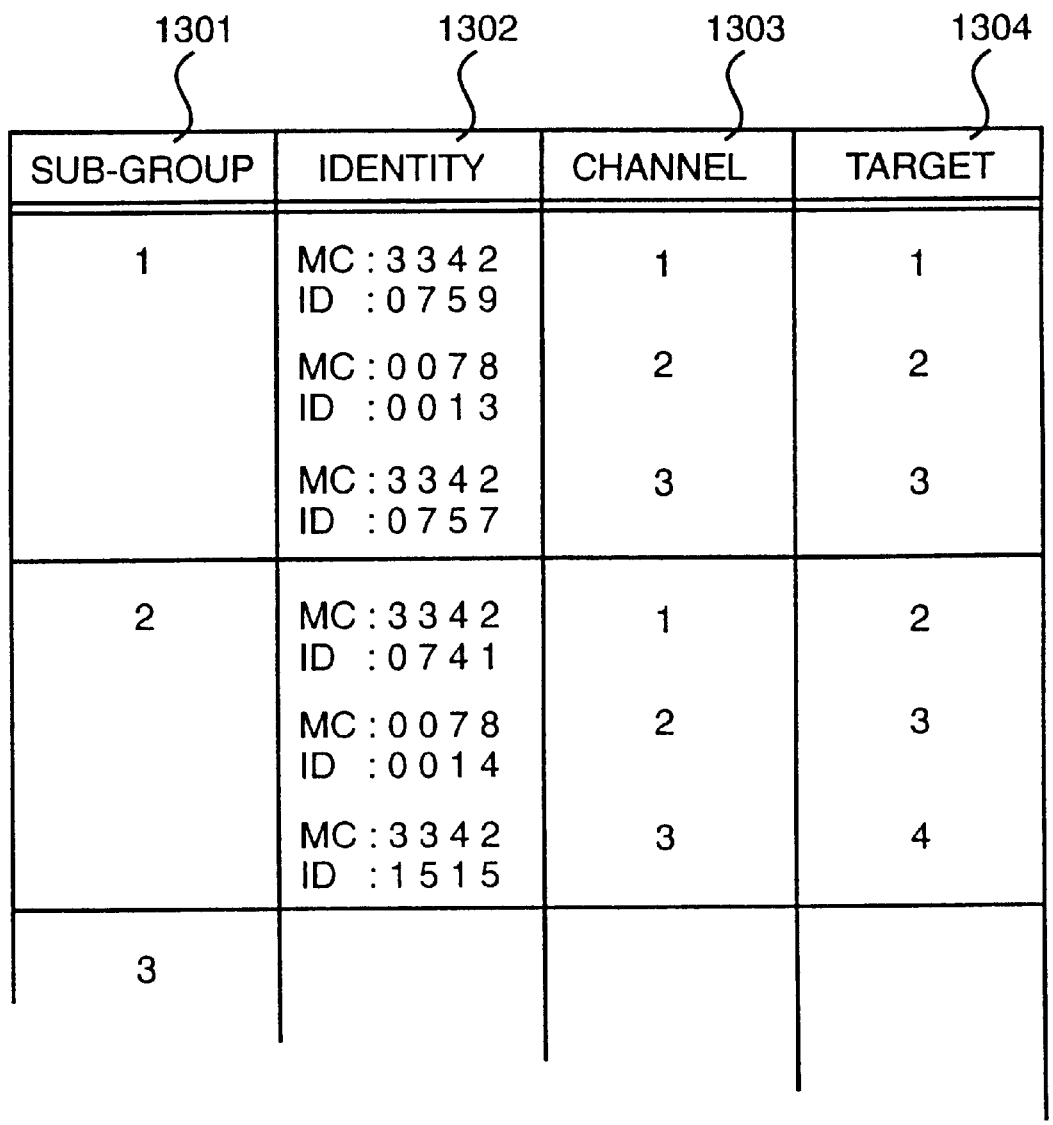
FIG. 13 details a mapping table for the identity codes in the array shown in FIG. 12.

A mapping table is shown in FIG. 13, having a predetermined subgroup size of three disks. The sub group column represents a pointer to a set of disk identities 1302. Each disk identity 1302 points to a channel 1303 and a target 1304 at which the disk identity is located. Thus, when striping over sub-group 1, the RAID access control process 704 looks up the identity numbers of each disk for the sub group. Given these identity numbers it becomes possible to identify the channel and target numbers for each disk, and thus perform the required array transfer operation.

In the event of re-arrangement of the disks, for whatever reason, an operator instructs the graphics processor to identify the identity 1302 for each channel and target in the array. Using this information it is then possible to replace channel 1303 and target 1304 data for each drive identity in each group. In this way, reconstruction of the array may be performed at random, or alternatively, by identifying a preferred location of drives, an operator may be instructed as to the correct placement of particular drives. Furthermore, when a spare drive has been logically mapped to a particular sub-group, the identity table 1302 along with the channel 1303 and target 1304 tables are updated accordingly. Thus, after physically moving the spare disk to replace the broken one, the graphics processor is able to automatically detect the change in identity and to continue operations with the minimum of operator intervention.

What I claim is:

1. Video data storage apparatus, comprising storage means, transfer means and processing means, wherein said storage means comprises a plurality of storage devices, each of said storage devices having a unique identifier applied thereto during manufacture and being positioned at an addressable physical location within an array, said transfer means is arranged to transfer video data stripes at a rate at least substantially equal to video display rate, and said processing means is configured to identify the unique identifiers applied to said storage devices and to retain a mapping of video data stripes to said storage devices such that video data stripes are assembled with reference to the unique identifiers and not with reference to the addressable physical locations.

2. Apparatus according to claim 1, wherein said processing means maps video data stripes to locations within the array and maps locations within the array to each storage device.

3. Apparatus according to claim 1, wherein said storage devices are magnetic disks.

4. Apparatus according to claim 3, wherein said disks are manually removable from the array.

5. Apparatus according to claim 1, wherein said transfer means is arranged to transfer image frames at a multiple of the video display rate.

6. Apparatus according to claim 1, including means for generating the video data stripes by scanning cinematographic film.

7. Apparatus according to claim 1, including means for generating the video data stripes from frames of high definition video.

8. Apparatus according to claim 1, including means for generating the video data stripes from fields of broadcast video.

9. Apparatus according to claim 1, including means for generating the data stripes from compressed video.

10. A method of storing video data signals, comprising steps of applying a unique identifier to each of a plurality of storage devices during manufacture, positioning each of said storage devices at an addressable physical location within an array, transferring video stripes to respective storage devices at a rate at least substantially equal to video display rate, and processing data to identify the unique identifiers applied to said storage devices and to retain a mapping of video data stripes to said storage devices such that video data stripes are assembled with reference to the unique identifiers and not with reference to the addressable physical locations.

11. A method according to claim 10, wherein video data stripes are mapped to locations within the array and locations within the array are mapped to each storage device.

12. A method according to claim 10, wherein said storage devices are magnetic disks.

13. A method according to claim 12, wherein said disks are manually removable from the array.

14. A method according to claim 10, wherein frames are transferred at a multiple of the video display rate.

15. A method according to claim 10, wherein the video data stripes are generated by scanning cinematographic film.

16. A method according to claim 10, wherein the video data stripes are generated from high definition video.

17. A method according to claim 10, wherein the video data stripes are generated from fields of broadcast video.

18. A method according to claim 10, wherein the video data stripes are generated from compressed video.

19. A data storage system comprising:

storage devices each having a unique identifier and positioned at respective addressable physical locations within an array, wherein the unique identifiers are independent of the addressable physical locations of said storage devices in the array;

a memory for storing first data relating respective data stripes of a data signal to the unique identifiers of said storage devices; and an access control circuit for accessing said storage devices using the first data stored in said memory such that the data stripes are assembled in the same order even if the physical locations of said storage devices are re-arranged.

20. A data storage system according to claim 19, wherein said memory stores second data relating the unique identifiers of said storage devices to the physical location of said storage devices within the array.

21. A data storage system according to claim 20, wherein the second data stored in said memory is updated when the location of any of said storage devices within the array is changed.

22. A data storage system according to claim 20, wherein said storage devices are targets on SCSI channels and the second data comprises channel and target data.

23. A data storage system according to claim 20, wherein the first and second data stored in said memory are updated when a spare storage device replaces a defective storage device.

24. A data storage system according to claim 19, wherein the data signal comprises a video data signal.

25. A data storage system according to claim 24, wherein the video data signal is a high definition video data signal.

26. A data storage system according to claim 24, wherein frames of the video data signal are divided into stripes and each storage device stores a respective corresponding one of the stripes.

27. A data storage system according to claim 19, wherein the unique identifier for each storage device is derived from a manufacturer's code and an identity number.

28. A data storage system according to claim 19, wherein said storage devices are magnetic disks.

29. A method of storing data using storage devices each having a unique identifier, the method comprising:

arranging said storage devices at respective addressable physical locations within an array, wherein the unique identifiers of said storage devices are independent of the addressable physical locations of said storage devices in said array;

storing in a memory first data relating respective data stripes of a data signal to the unique identifiers of said storage devices; and accessing said storage devices using the first data stored in said memory such that the data stripes are assembled in the same order even if the physical locations of said storage devices in the array are re-arranged.

30. A method according to claim 29, wherein the method comprises the further step of storing second data relating the unique identifiers of said storage devices to the physical location of said storage devices within the array, and said storage devices are accessed using the first and second data stored in said memory.

31. A method according to claim 30, comprising the further step of:

updating the first and second data stored in said memory when a spare storage device replaces a defective storage device.

32. A method according to claim 30, comprising the further step of:

updating the second data stored in said memory when the location of any of said storage devices within the array is changed.

33. A method according to claim 29, wherein said storage devices are magnetic disks.

34. A method according to claim 29, wherein the identifier for each storage device is derived from a manufacturer's code and an identity number.

35. A method according to claim 29, wherein the data signal comprises a video data signal.

* * * * *